United States Patent
Kim

(10) Patent No.: US 7,804,861 B2
(45) Date of Patent: Sep. 28, 2010

(54) DEMULTIPLEXER AND DEMULTIPLEXING METHODS FOR DIGITAL BROADCASTING RECEIVER

(75) Inventor: Tae-Su Kim, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1697 days.

(21) Appl. No.: 10/986,952

(22) Filed: Nov. 15, 2004

(65) Prior Publication Data

US 2005/0180467 A1  Aug. 18, 2005

(30) Foreign Application Priority Data

Feb. 4, 2004 (KR) ............... 10-2004-0007213

(51) Int. Cl.
*H04J 3/02* (2006.01)
(52) U.S. Cl. ............... 370/542; 386/46; 725/151
(58) Field of Classification Search ........... None
See application file for complete search history.

(56) References Cited

U.S. PATENT DOCUMENTS

| | | | | |
|---|---|---|---|---|
| 6,690,377 B2* | 2/2004 | Tuomi | | 345/519 |
| 6,720,968 B1* | 4/2004 | Butler et al. | | 345/535 |
| 6,748,481 B1* | 6/2004 | Parry et al. | | 711/100 |
| 6,961,781 B1* | 11/2005 | Mukherjee et al. | | 709/240 |
| 7,020,081 B1* | 3/2006 | Tani et al. | | 370/230 |
| 2002/0087999 A1* | 7/2002 | Kashima | | 725/100 |
| 2002/0146023 A1 | 10/2002 | Myers | | |
| 2005/0047448 A1* | 3/2005 | Lee et al. | | 370/536 |
| 2005/0262537 A1* | 11/2005 | Baran et al. | | 725/88 |
| 2008/0163327 A1* | 7/2008 | Miyagoshi | | 725/134 |

FOREIGN PATENT DOCUMENTS

| | | |
|---|---|---|
| CN | 1406001 | 3/2003 |
| JP | 2000-031964 | 1/2000 |
| KR | 10-0327388 | 2/2002 |
| KR | 2002-0096650 | 12/2002 |

OTHER PUBLICATIONS

Chinese Office Action corresponding to counterpart Chinese Application No. 2005100717250 dated Feb. 6, 2009.

* cited by examiner

*Primary Examiner*—Seema S Rao
*Assistant Examiner*—Rhonda Murphy
(74) *Attorney, Agent, or Firm*—Harness, Dickey & Pierce, P.L.C.

(57) ABSTRACT

An exemplary embodiment of the present invention may provide an arbiter, a demultiplexer, and a digital receiver. An exemplary embodiment of the demultiplexer may include packet identifier filters, first-in first-out memories, an arbiter, and a conditional access buffer. Another exemplary embodiment of the present invention provides a method for demultiplexing multiplexed broadcasting signals.

20 Claims, 8 Drawing Sheets

DEMULTIPLEXER AND DEMULTIPLEXING METHODS FOR DIGITAL BROADCASTING RECEIVER

BACKGROUND OF THE INVENTION

This application claims the priority of Korean Patent Application No. 2004-7213, filed on Feb. 4, 2004, in the Korean Intellectual Property Office, the disclosure of which is incorporated herein in its entirety by reference.

FIELD OF THE INVENTION

Exemplary embodiments of the present invention relate to a digital receiver (e.g., a digital broadcasting receiver) and a demultiplexer, which may be included in a digital receiver. The digital receiver may demultiplex a digital stream (e.g., a digital broadcasting stream) of signals (e.g., multiplexed broadcasting signals) to watch and/or record channels (e.g., multiplexed broadcasting channels), for example, simultaneously.

DESCRIPTION OF THE CONVENTIONAL ART

In conventional digital broadcasting receivers, radio frequency (RF) modules may extract digital broadcasting streams such as transport streams (TS) and/or direct satellite service (DSS) streams (e.g., from wireless sky waves) and packet identifier (PID) filters may extract the digital broadcasting streams of the relevant broadcasting channels. The extracted digital broadcasting streams may be decoded by decoders. The digital broadcasting receivers may generate display and/or audio driving signals through audio and/or video (AV) output circuits, and users may watch images and/or sounds displayed and/or output from display units and/or speakers.

Conventional digital broadcasting receiver may extract a digital broadcasting stream, which may correspond to a selected broadcasting channel, through one or more PID filters when a user selects a desired broadcasting channel. In the conventional digital broadcasting receivers, two or more broadcasting channels may not be selected, and the corresponding digital broadcasting streams may not be extracted, and/or decoded simultaneously. Users may desire watch two or more broadcasting channels and/or record one or more different broadcasting channels. For example, users may record a direct television broadcasting channel, which may have a DSS stream format, while simultaneously watching two advanced television system committee (ATSC) broadcasting channels having a TS stream format. Conventional digital broadcasting receivers may extract and/or decode a plurality of digital broadcasting streams through a plurality of PID filters.

Conventional digital broadcasting receivers, which may process the digital broadcasting stream corresponding to one selected broadcasting channel may not process a plurality of digital broadcasting streams. In order to process the digital broadcasting streams corresponding to two or more broadcasting channels, arbitration of a conditional access (CA) buffer interface may be utilized. Each broadcasting channel may have a different conditional access method of processing the relevant digital broadcasting streams, and various arbitration algorithms for interfacing the CA buffer, in which the digital broadcasting streams may be stored, may be developed. In the CA buffer the digital broadcasting streams may be stored in a packet unit, A conventional demultiplexer may use a dual port static random access memory (SRAM) as the CA buffer and may perform arbitration in which the digital broadcasting stream packets, which may be input through the same channel source, may be interfaced with the CA buffer. The packets may be transferred without a change of order, the memory capacity may increase, and the arbitration may be less efficient.

SUMMARY OF THE INVENTION

Exemplary embodiments of the present invention provides a demultiplexer of a receiver (e.g., a digital broadcasting receiver), which may arbitrate a conditional access (CA) buffer interface to efficiently perform buffer management by using a CA buffer having a minimum capacity, so as to simultaneously process channel signals (e.g., digital broadcasting channel signals).

In an exemplary embodiment of the present invention, a demultiplexer of a receiver may include packet identifier filters, a first memory, and an arbiter. The packet identifier filters may extract digital streams and output the extracted digital broadcasting streams. The first memory may receive the extracted digital streams, store the digital streams in a word unit, generate write request signals for words of a corresponding channel, and output the words in response to grant signals. The arbiter may determine priorities of a read request signal and corresponding write request signals of the digital streams, and generate grant signals corresponding to the priorities, to arbitrate read and write access to the digital streams.

In another exemplary embodiment of the present invention, a demultiplexing method may include extracting and outputting digital streams. The digital streams may be stored and write request signals for words of the corresponding broadcasting channel may be generated. The corresponding words of the digital broadcasting streams may be output in the multiplexed channels in response to grant signals and priority may be given to a read request signal and a write request signals for the digital streams through an arbiter.

In exemplary embodiments of the present invention, the demultiplexer may also include a conditional access buffer and a conditional access module. The conditional access buffer may store the digital streams output from the first memory in response to the grant signals, and output the corresponding digital streams in response to the grant signals. The conditional access module may receive the digital streams output from the conditional access buffer, descramble the received digital streams, and generate a buffer read request signal when the received digital streams are descrambled.

In exemplary embodiments of the present invention, the input digital streams may be transport streams, which may be output from the first memory in a unit of 192 bytes including a packet of 188 bytes. The input digital streams may be direct satellite service (DSS) streams, which may be output from the first memory in a unit of 136 bytes including a packet of 130 bytes.

In exemplary embodiments of the present invention, a control word including data on a packet identifier index may be stored in the last address of a conditional access buffer. The packet identifier index may be a start position for scrambling, a packet type, a key type, a demultiplexing validity, and a conditional access type.

In exemplary embodiments of the present invention, an arbiter may store a corresponding address in a service queue when the last address word is stored in the conditional access buffer. The arbiter may output the control word out of the digital streams, which may be stored at the corresponding address in the conditional access buffer, indicated by the service queue, and may output the other words, when priority is given to the conditional access buffer based on the buffer read request signal.

In exemplary embodiments of the present invention, the demultiplexer may further include an external memory. The external memory may allow digital streams stored in a word unit in the first memory to be bypassed and temporarily stored under a direct memory access (DMA) control when usage of the conditional access buffer is greater than a threshold level. The write request signal corresponding to the channel in which the bypassed words have been output may be excluded from the determination of priority.

In exemplary embodiments of the present invention, the demultiplexer may further include a second memory. The second memory may receive and store bypassed words from the external memory and may generate a write request signal for write access, under the direct memory access (DMA) control when the usage of the conditional buffer is less than the level. Priority may be given to the write request signal, which may be generated from the second memory by using a round robin system.

In exemplary embodiments of the present invention, the demultiplexer may further include a plurality of first-in first out (FIFO) memories. The memories may store digital streams corresponding to relevant channels. Each of the FIFO memories may include a first register, which may store first, second, and third bytes constituting a word of the received digital streams, a second register, which may store the first, second, third bytes and a next fourth byte constituting the word or outputs a previous word, in response to a state control signal, and a third register, which may store first, second, third, and fourth bytes constituting a next word during the outputting of the second register and outputs a previous word during the storing of the second register, in response to the state control signal. The FIFO memories may also include a state machine, which may generate the state control signal indicating a storing time and an outputting time of the registers by using the grant signals, and generate the write request signals when the corresponding register completes the storing of a word unit.

In exemplary embodiments of the present invention, the arbiter may assign the highest priority to the read request signal, and may sequentially assign next priorities to the write request signals by using a round robin system.

BRIEF DESCRIPTION OF THE DRAWINGS

The above and other features and advantages of the present invention will become more apparent from detailed description of exemplary embodiments thereof with reference to the attached drawings in which.

DETAILED DESCRIPTION OF THE EXEMPLARY EMBODIMENTS OF THE PRESENT INVENTION

Figure 1:
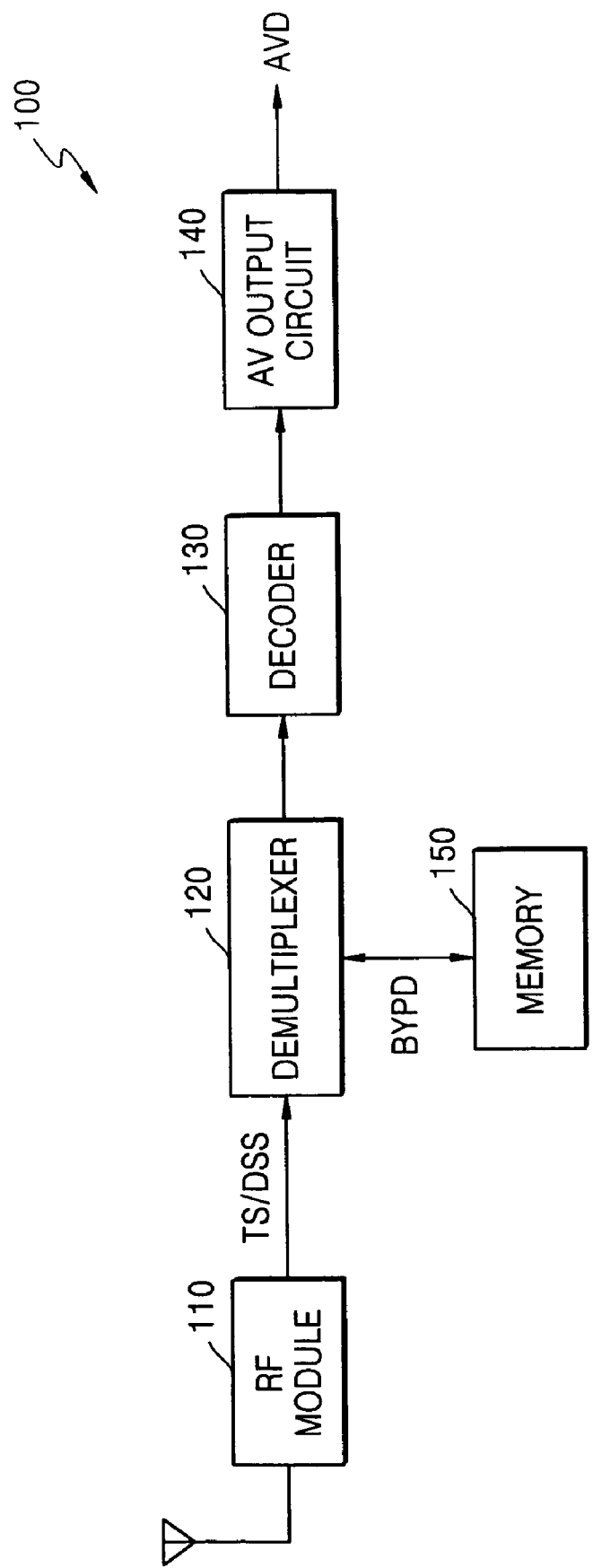
FIG. 1 is a block diagram illustrating a digital broadcasting receiver according to an exemplary embodiment of the present invention.

The attached drawings for illustrating exemplary embodiments of the present invention are referred to in order to gain a sufficient understanding of the present invention, the merits thereof, and the objectives accomplished by the implementation of the present invention.

The present invention will be described in detail by explaining exemplary embodiments of the invention with reference to the attached drawings. Like reference numerals in the drawings denote like elements.

FIG. 1 is a block diagram illustrating an exemplary embodiment of the digital receiver (e.g., digital broadcasting receiver) 100, which may include a demultiplexer 120. The digital receiver 100 may further comprise a radio frequency (RF) module 110, a demultiplexer 120, a decoder 130, an audio and/or video (AV) output circuit 140, and an external memory 150. The RF module 110 may extract digital signals (e.g., digital broadcasting signals), for example, transport streams (TS) and/or direct satellite service (DSS) streams (e.g., from wireless sky waves) and may output the extracted digital signals. The digital streams (e.g., digital broadcasting streams) may include audio and/or video signals, which may correspond to respective digital channels (e.g., digital broadcasting channels) and may allow one or more digital channels to be watched, for example, simultaneously. The demultiplexer 120 may extract the digital streams of the respective digital channels, arbitrate the extracted digital streams, descramble, and output the arbitrated streams. Control words, which may allow packets to be identified with one or more corresponding to digital channels, may be added to the digital streams (e.g., TS and/or DSS). The external memory 150 may be used to perform the arbitration, and may be included in the demultiplexer 120.

A user may watch and/or record one or more channels (e.g., digital broadcasting channels), for example, simultaneously. The decoder 130 may decode the digital streams, which may be output from the demultiplexer 120. The AV output circuit 140 may generate display and/or audio driving signals using the decoded digital streams. Users may watch and/or hear images and/or sounds, which may be displayed by a display unit (e.g., a liquid crystal display (LCD)) and/or a speaker.

The CA module 126 and a CA buffer 125 may process the digital streams, which may correspond to two or more digital channels. Arbitration may be used for buffer interface in the demultiplexer 120. Multiple conditional access methods may be used for the respective channels and there may be an arbitration algorithm for the CA buffer interface.

The arbitration algorithm may include storing the respective digital streams in a buffer (e.g., 192 bytes or 136 bytes) and transmitting the respective digital streams to the CA module 126.

Figure 2:
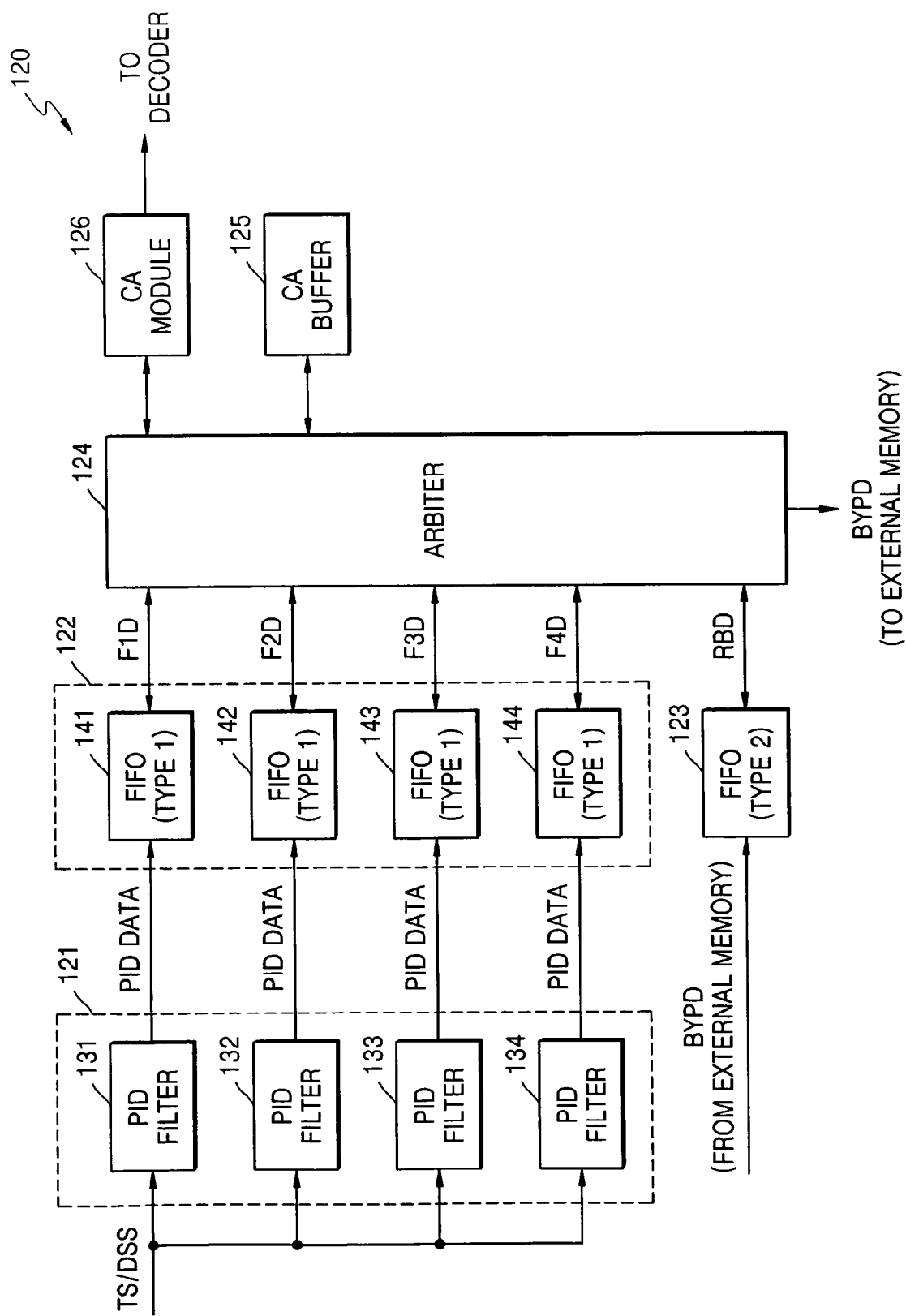
FIG. 2 is a block diagram illustrating a demultiplexer according to an exemplary embodiment of the present invention.

FIG. 2 is a block diagram illustrating an exemplary embodiment of the demultiplexer 120 shown in FIG. 1. As shown in FIG. 2, the demultiplexer 120 may include the PID filters 121, memories 122 and 123, an arbiter 124, a CA buffer 125, and a CA module 126.

The PID filters 121 may extract digital streams, corresponding to respective digital channels, from the input digital streams, and may output the extracted digital streams for a plurality of channels. If the input digital streams are TS streams, a control word of, for example, four bytes may be output together with the digital streams. The TS streams may packetized in, for example, 188 byte packets. If the input digital streams are DSS streams, dummy data of, for example, two bytes and a control word of, for example, four bytes may be output with the digital streams. The digital streams may be packetized in, for example, 130 byte packets.

The control words may identify packets with a corresponding digital stream. The digital streams may have packet sizes of 188 bytes or 130 bytes. A control word, which may have, for example, 32 bits, as shown in Table 1, may include information pieces on a PID index.

The information pieces on the PID index may be used to identify the packets in the PID filters 121. A scramble start position may indicate a start position of the encoded portion, a packet type may indicate the type of stream (e.g., a TS stream or a DSS stream), a key type may indicate the type of key (an odd key or an even key) used in encoding, a demultiplexing validity may indicate viewing and/or recording, and a CA type may indicate an encoding type (e.g., 3 DES, DES, DVB-CSA, AES, etc.). A control word may be used for decoding and/or the descrambling process in the CA module 126.

signal REQ for the channels, and may output the digital streams stored in a word unit in response to grant signals GNT from the arbiter 124.

The arbiter 124 may provide priority to a read request signal CAREQ, which may be generated from the CA module 126 using a buffer read request signal RDREQ, and write request signals REQ. The buffer read request signal RDREQ and the write request signals REQ may correspond to respective digital streams, and may generate the grant signals GNT, to arbitrate at least one bus for read access and/or write access to the digital streams. The arbiter 124 may give a higher priority (for example, the highest priority) to the read request signal RDREQ, and may assign subsequent priorities (for example, sequentially assign) to the write request signals REQ in, for example, a round robin system.

The CA buffer 125 may store the corresponding digital stream, which may be output from the memory 122 in a unit (192 bytes or 136 bytes) in response to the grant signals GNT. The grant signals GNT may correspond to the write request signals REQ, and the CA buffer 125 may output the corresponding digital stream in response to the grant signal GNT, which may correspond to the read request signal CAREQ. If the input digital streams are, for example, transport streams (TS), the units may each be 192 bytes, which may include a control word of, for example, four bytes. If the input digital streams are, for example DSS streams, the units may each be 136 bytes, which may include dummy data of, for example, two bytes and a control word of, for example, four bytes. The CA module 126 may receive the digital stream through arbitration of at least one bus, descramble the received digital stream in a packet (e.g., 188 bytes or 130 bytes), and generate the buffer read request signal, for example, when the descrambling has been completed. The CA module 126 may generate a buffer read request signal for each of the descrambled digital stream.

In FIG. 1, if the usage of the CA buffer 125 is greater than a threshold level, the corresponding FIFO memory of the memory 122 may be bypassed and the digital stream may be stored in a word unit in the external memory 150. The digital

TABLE 1

| [31:24] | [23:16] | [15] | [14] | [13] | [12:11] |
|---|---|---|---|---|---|
| PID index (i_index[7:0]) | Scramble start position (i_scrm_start_byte[7:0]) | Packet type 1: DSS 0: TS (i_DSS or TS) | Key type 1: odd key 0: even key (i_odd_even_key) | dmx valid (i_dmx_valid) | Ca type 00: des 01: 3des 10: dvb 11: aes (i_ca_type[1:0]) |

A user may watch and/or record a plurality (e.g., four) of channels (for example, simultaneously). Four PID filters 131-134 may each extract and output at least one digital stream of a corresponding digital channel. Other PID filters may be provided and users may watch and/or record a greater number of channels.

The memory 122 may receive the digital streams of the respective channels in a byte (e.g., eight bits) unit, and may store the received digital streams. The memory 122 may comprise a plurality of first-in first-out (FIFO) memories 141 to 144, which may store the digital streams corresponding to the respective channels. The FIFO memories 141 to 144 may store (e.g., completely store) the digital streams in word units. The FIFO memories 141 to 144 may generate a write request stream may be stored under a direct memory access (DMA) control for accessing the external memory 150. The write request signal corresponding to a bypassed channel, for which bypassed words BYPD may have been output, may be excluded from determination of the priority of bus use by the arbiter 124.

If the usage of the CA buffer 125 is less than a threshold level, the second memory 123 (e.g., FIFO memory) may receive and store bypassed words BYPD from the external memory 150, and may generate at least one write request signal for write access. The second memory 123 may store eight words of a 32 bit unit. The arbiter 124 may give next higher priority to the write request signals generated from the second memory 123 and memory 122 priority in, for example, a round robin system.

Figure 3:
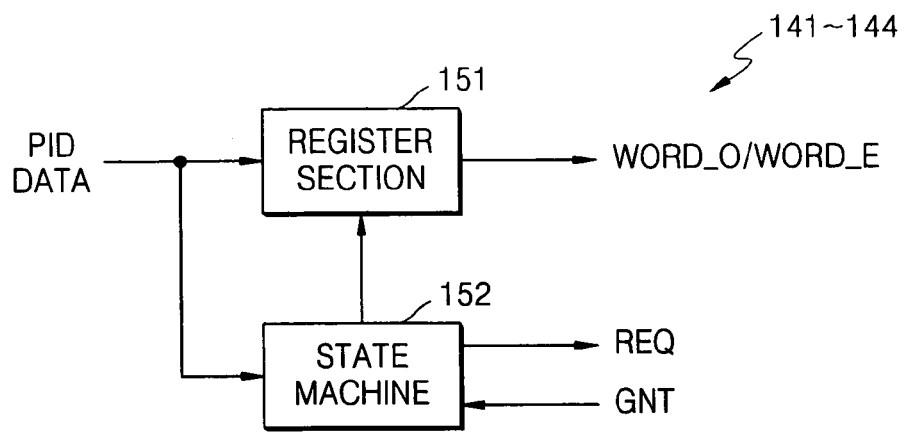
FIG. 3 is a block diagram illustrating an example of the structure of first type first-in first out (FIFO) memories according to an exemplary embodiment of the present invention.
Figure 4:
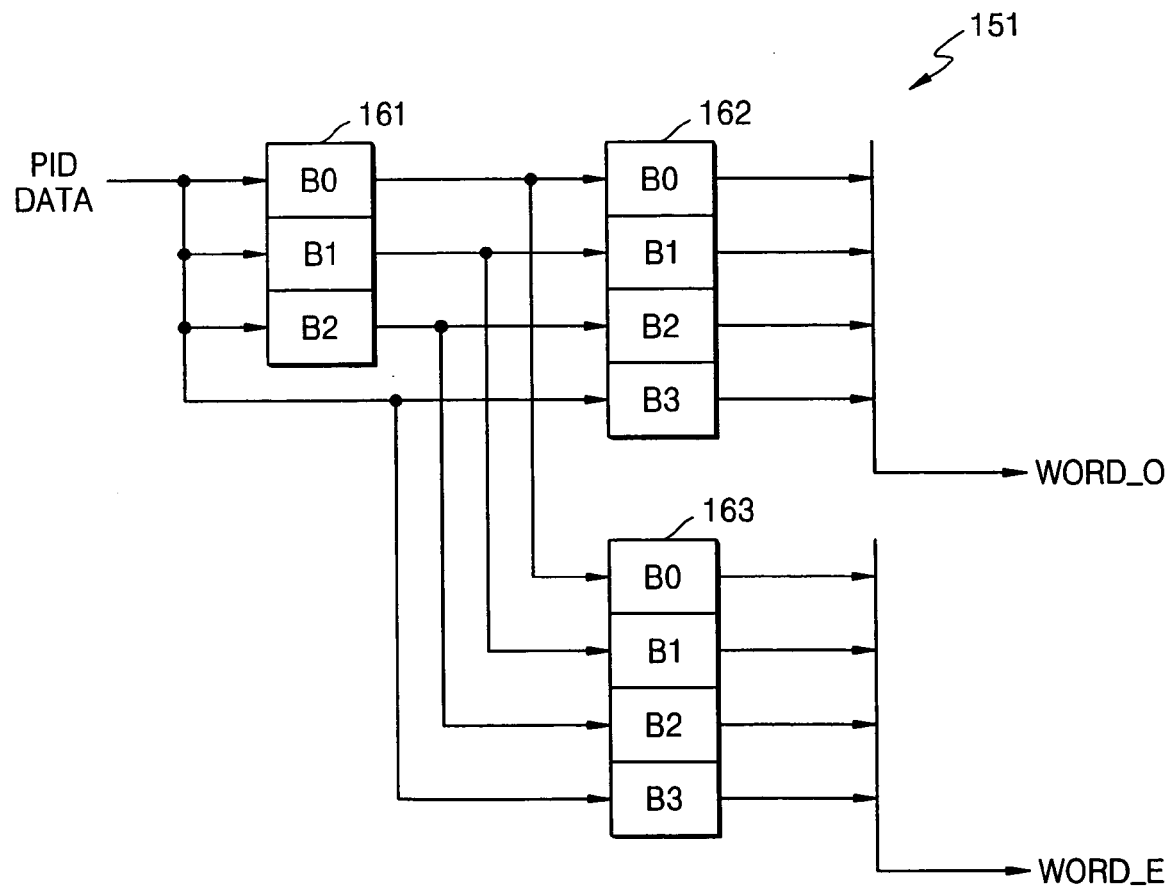
FIG. 4 is a block diagram illustrating an example of the structure of a register section according to an exemplary embodiment of the present invention.

FIG. 3 is a block diagram illustrating examples of the memories 141 to 144 (e.g., FIFO memories). As shown in FIG. 3, the memories 141 to 144 may include a register section 151 and a state machine 152. FIG. 4 is a block diagram illustrating an example structure of the register section 151 shown in FIG. 3. As shown in FIG. 4, the register section 151 may comprise registers 161, 162, and 163. The register 161 may store three byte data of eight bits. The register 162 and/or the register 163 store four byte data of eight bits. The register 161 may store, for example, first, second and third bytes of the received digital stream (e.g., PID data). The register 162 may store, for example, the first, second, third bytes and a fourth byte, which may constitute a word and may output a word WORD_0, which may have been previously stored, in response to a state control signal (not shown). The register 163 may store, for example, the first, second, third and fourth bytes, which may constitute another word (for example, a next word). The register 163 may store the another word while the second register 162 may output a previously stored word and may output a previous word WORD_E during the storing of the second register 162 in response to the state control signal.

The state control signal may be generated from the state machine 152. The state machine 152 may generate the state control signal, which may indicate a storing time and/or an outputting time by using the grant signal GNT, which may be generated from the arbiter 124. A corresponding register may complete a storing action in a word unit and a write request signal REQ may be generated.

Figure 5:
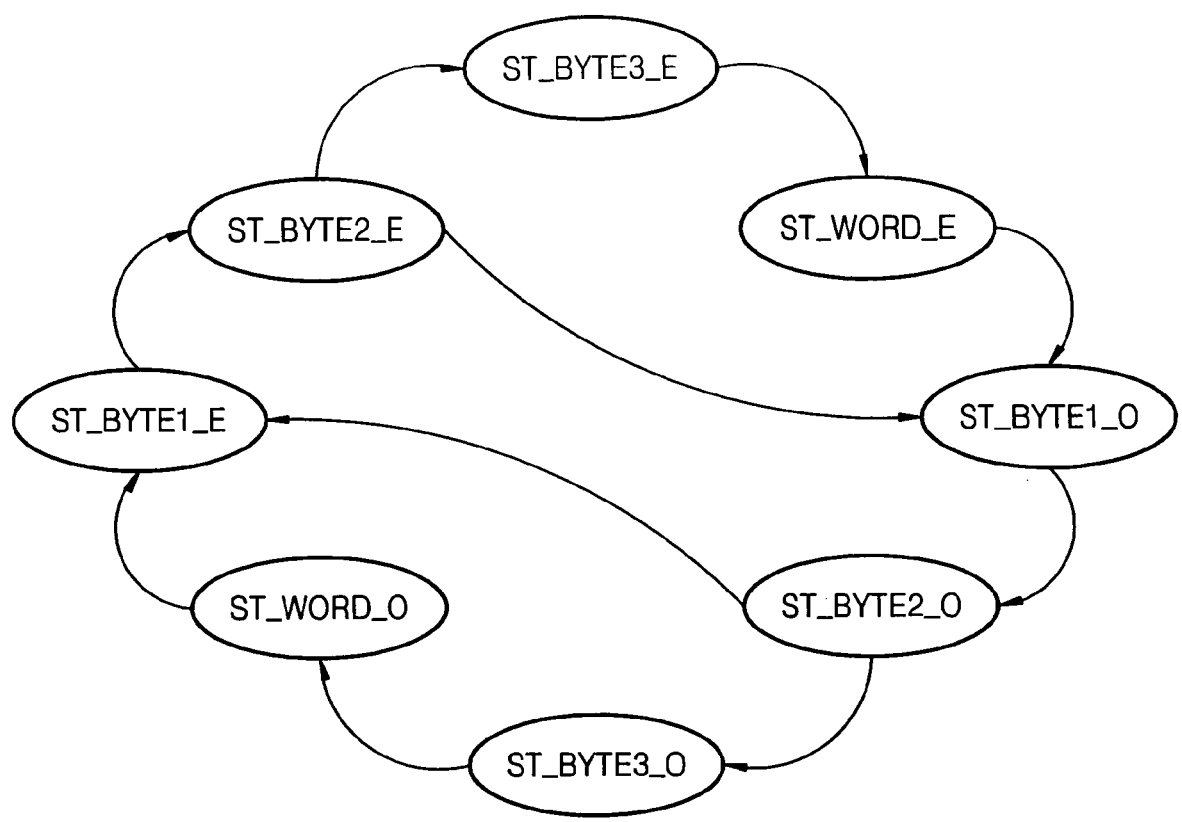
FIG. 5 is a state diagram illustrating an example of the storage action controls in a byte unit and/or in a word unit of packet identifier (PID) data in a state machine according to an exemplary embodiment of the present invention.

FIG. 5 is a state diagram illustrating an exemplary embodiment of the storage control in a byte unit and/or in a word unit of the PID data in the state machine 152. Referring to FIG. 5, the register 163 may be at an outputting time and the register 162 may be at a storing time. The register 161 may store the first, second and third bytes at ST_BYTE1_0, ST_BYTE2_0, and ST_BYTE3_0, respectively. At ST_WORD_0, the register 162 may store the first, second, third bytes and a next fourth byte, which may constitute a word. The register 162 may be at an outputting time and the register 163 may be at a storing time, and the register 161 may store the first, second and third bytes at ST_BYTE1_E, ST_BYTE2_E, and ST_BYTE3_E, respectively. At ST_WORD_E, the register 163 may store the first, second, third bytes and a next fourth byte, which may constitute a word. If the digital stream is, for example, a TS stream, valid data stream packets of 188 bytes may be stored in the register 162 and/or the register 163, and may be output to the arbiter 124 in a word unit.

If the digital stream is, for example, a DSS stream, the last data of the data stream of 130 bytes may have two bytes (129-th and 130-th bytes) and the storing action from a byte unit to a word unit of the PID data by the register 161 may be completed for, for example, two cycles of a system clock. In FIG. 5, the register 163 may store the data at ST_WORD_E. And then, the last data of two bytes of the digital stream (e.g., DSS stream) may be received by register 161. The register 161 may store the first and second bytes at the ST_BYTE1_0 and ST_BYTE2_0, respectively, and the last data of two bytes, which may be stored in register 161, may be shifted and/or stored in register 162 at ST_BYTE1_E. Dummy data of two bytes may be stored in the remaining two bytes of the, for example, four byte storing locations in register 162. The second register 162 may store the last data of two bytes and the dummy data of two bytes and register 163 may output a word (for example, a previous word). Likewise, the register 162 may store the data at ST_WORD_0. And then, the last data of two bytes (129-th and 130-th bytes) of the digital stream (e.g., DSS stream) may be received by register 161. The register 161 may store the first and second bytes at ST_BYTE1_E and ST_BYTE2_E, respectively, and the last data of two bytes, which may be stored in the register 161, may be shifted and/or stored in the register 163 at ST_BYTE1_0. Dummy data of two bytes may be stored in, for example, another two bytes of the four byte storage locations within the register 163.

The outputting action of the PID data, which may be stored in the memories (e.g., FIFO memories) 141 to 144 to the arbiter 124 may be performed.

Figure 6:
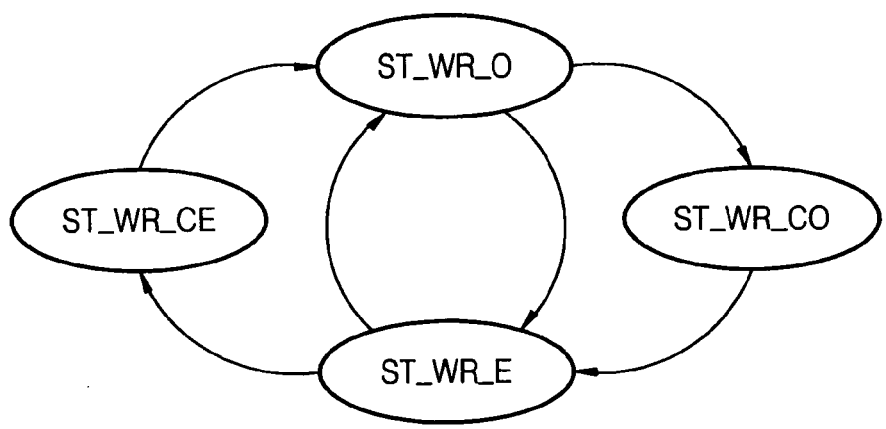
FIG. 6 is a state diagram illustrating an example of output action controls of the PID data in a state machine shown according to an exemplary embodiment of the present invention.

FIG. 6 is a state diagram illustrating an example of the output control of the PID data in the state machine 152. As shown in FIG. 6, the register 162 and/or the register 163 may store a word and may generate a corresponding write request signal REQ (see FIG. 7) at ST_WR_0 or ST_WR_E. A corresponding grant signal may be received from the arbiter 124 and the PID data, which may be stored in the register 162 or the register 163, may be transmitted to the arbiter 124 and stored in the CA buffer 125.

Figure 7:
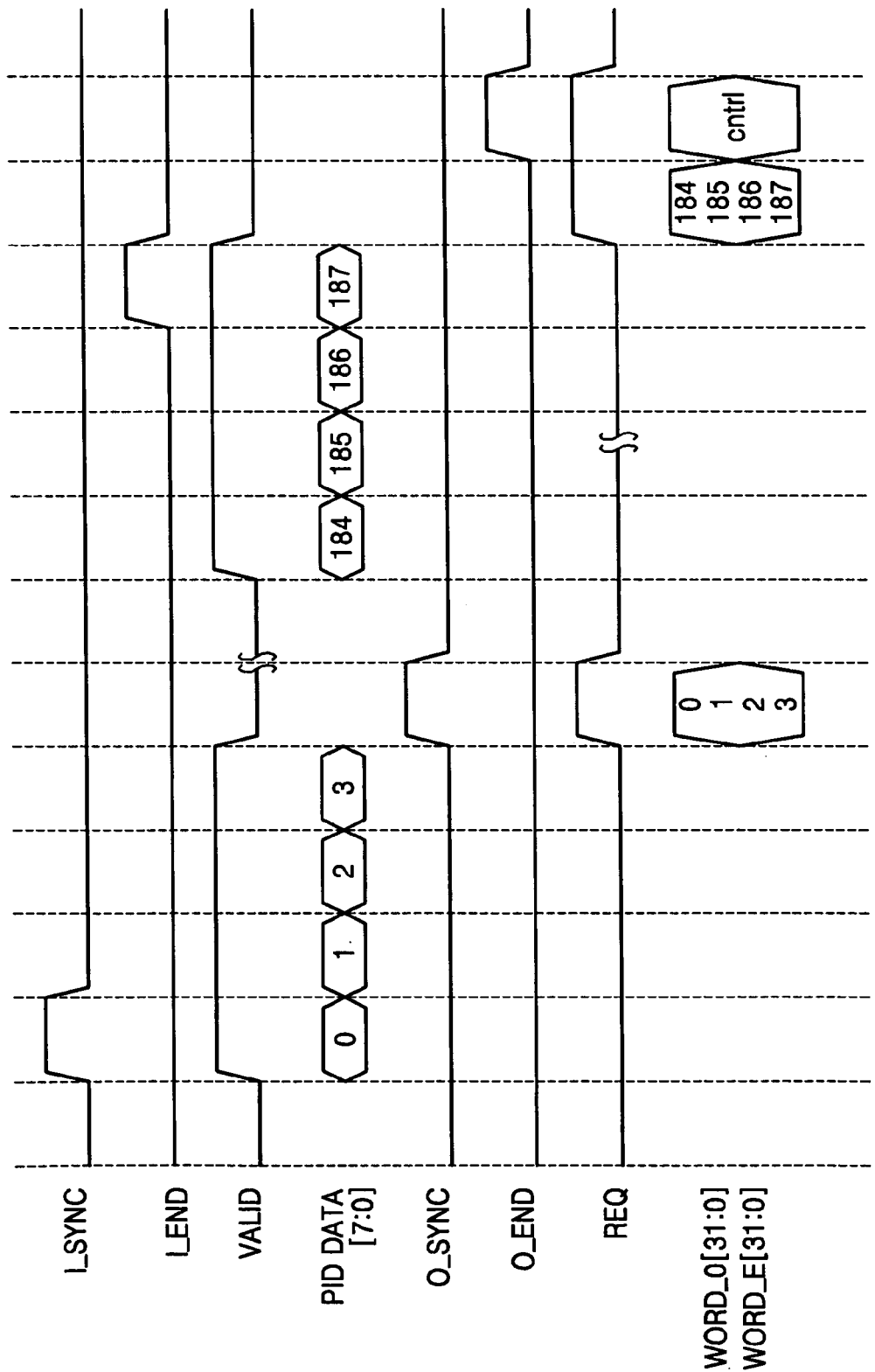
FIG. 7 is a timing chart illustrating an example of the actions of the first type FIFO memories according to an exemplary embodiment of the present invention.

FIG. 7 is a timing diagram illustrating examples of actions of the memories (e.g., FIFO memories) 141 to 144. In FIG. 7, I_SYNC and I_END, which may be, for example, synchronous signals, may indicate a start time and an end time of the data stream of 188 bytes, which may be input (e.g., input periodically). A control word may be generated internally, and/or from another circuit (not shown).

In FIG. 7, 0_SYNC may indicate a transmitting time of a word (e.g., a word of 188 bytes) to the arbiter 124. A write request signal REQ, corresponding to the control word, may be generated, for example, in synchronism with a signal 0_END. Signal 0_END may indicate transmission of the last word to the arbiter 124. For write access to the control word of a digital stream (e.g., a DSS stream), a write request signal REQ corresponding to the control word, which may be generated from the PID filters 121, may be generated at ST_WR_CO and/or ST_WR_CE.

Figure 8:
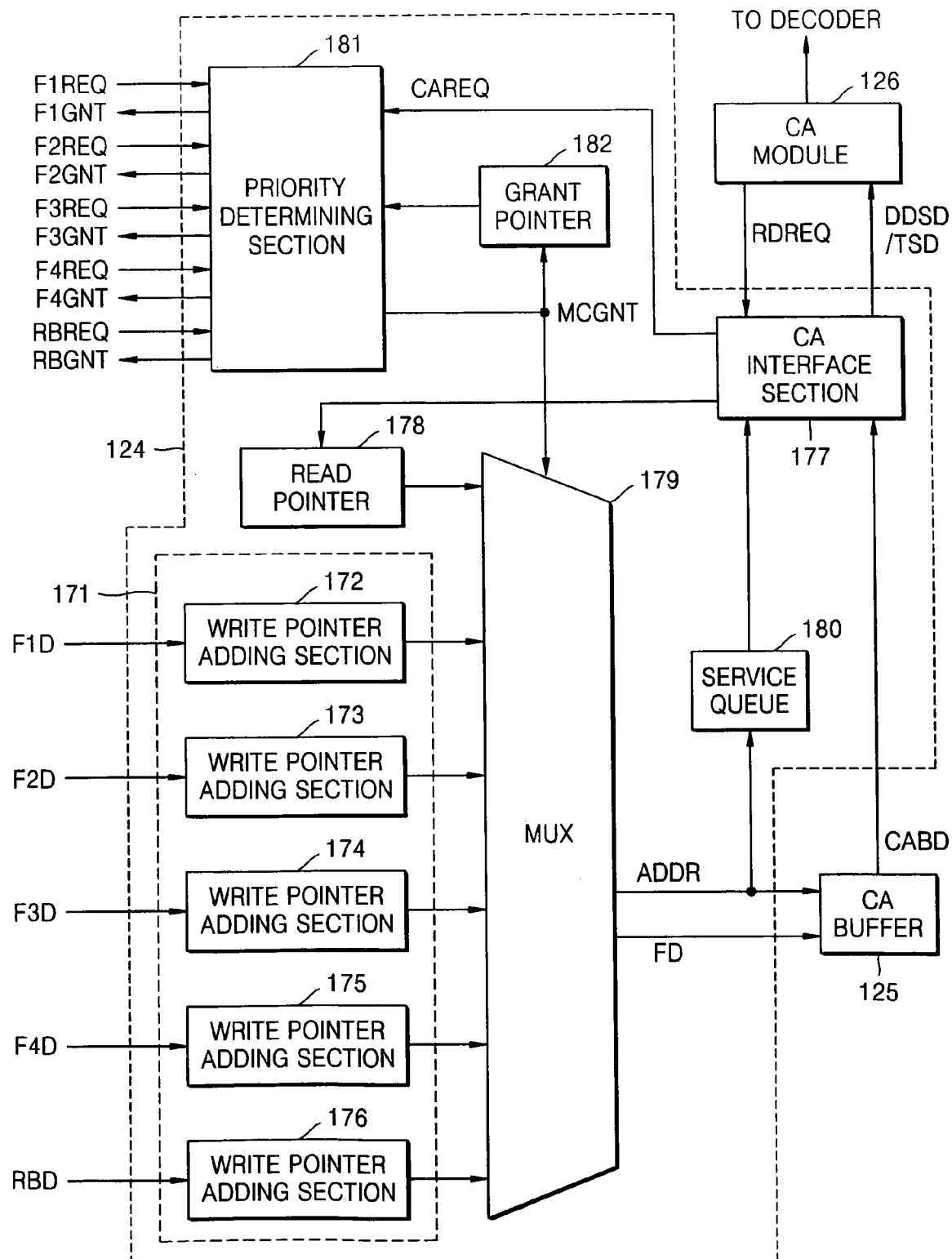
FIG. 8 is a block diagram illustrating an arbiter according to an exemplary embodiment of the present invention.

FIG. 8 is a block diagram illustrating the arbiter 124 shown in FIG. 2. As shown in FIG. 8, the arbiter 124 may comprise an adder 171 for adding a write pointer value, a CA interface 177, a read pointer 178, a multiplexer 179, a service queue 180, a priority determining section 181, and a grant pointer 182.

The CA module 126 may receive the digital stream (e.g., DSS stream or transport stream (TS)), which may be output from the CA buffer 125, descramble the received digital stream into a packet or packets (e.g., 188 or 130 bytes), and generate the buffer read request signal RDREQ through the arbitration of the arbiter 124, the buffer read request signal RDREQ may be generated, for example, each time the descrambling may be completed. The CA buffer 125 may store the digital streams (e.g., PID data), which may be transmitted from the memories (e.g., FIFO memories) 122, 123 through the arbitration of the arbiter 124.

In the arbiter 124 shown in FIG. 8, the priority determiner 181 may determine the priorities of a read request signal CAREQ and/or write request signals F1REQ to F4REQ and RBREQ from the memories (e.g., FIFO memories) 141 to 144 and 123, and may generate corresponding grant signals. The arbiter 124 may assign a higher priority (e.g., the highest priority) to the read request signal RDREQ through the priority determiner 181, and may assign (for example, sequentially) other priorities to the write request signals REQ by using, for example, a round robin system. The grant signals F1GNT to F4GNT and RBGNT may be transmitted to the memories (e.g., FIFO memories) 141 to 144 and the memory (e.g., FIFO memory) 123, and a grant signal corresponding to the read request signal CAREQ and a multiplexer control signal MCGNT may be generated. In response to the multiplexer control signal MCGNT, the multiplexer 179 may output (e.g., selectively output) the data, which may be obtained by adding a write pointer value ADDR to respective PID data F1D to F4D and RBD from the memories (e.g., FIFO memories) 141 to 144 and 123 through the write pointer adding sections 172 to 176. The PID data FD, which may be output from the multiplexer 179, may be stored at the address of the CA buffer 125, and may indicated by the write pointer value ADDR. For the read request signal RDREQ, which may correspond to the buffer read request signal RDREQ from the CA module 126, a read pointer value ADDR may be output through the multiplexer 179 in response to the multiplexer control signal MCGNT, which may be generated when the grant signal from the priority determiner 181 may be received. The grant pointer 182 may increase the pointer value by, for example, one when the grant signal may be generated (for example, each time the grant signal may be generated). The pointer value may be used in determining another priority using, for example, the round robin system in the priority determiner 181. The write pointer adder 172 to 176 and the read pointer 178 may increase the pointer value by, for example, one when the PID data F1D to F4D and RBD, which may correspond to generation of the grant signals and the read pointer value, may be output through the multiplexer 179 (for example, each time the PID data F1D to F4D and RBD may be output).

If the control word is stored at the last address in the CA buffer 125, the arbiter 124 may store the corresponding address in the service queue 180. The CA interface unit 177 may generate a read request signal CAREQ, which may use the buffer read request signal RDREQ and the priority determiner 181 may assign priority for the use of a bus to the CA buffer 125. The data stream CABD may be stored at the address of the CA buffer 125, which may be indicated by the service queue 180, and may be output from the CA buffer 125. The data stream CABD, which may be output from the CA buffer 125, may be transmitted to the CA module 126 through the CA interface 177. The control word of the data stream CABD of, for example, 192 bytes or 136 bytes, which may be stored at the address of the CA buffer 125 indicated by the service queue 180, may be output. As described above, the control word, which may be stored at the last address of the CA buffer 125, may include, for example, data on a packet identifier (PID) index, a start position for scrambling, a packet type, a key type, a demultiplexing validity, and a conditional access type.

Figure 9:
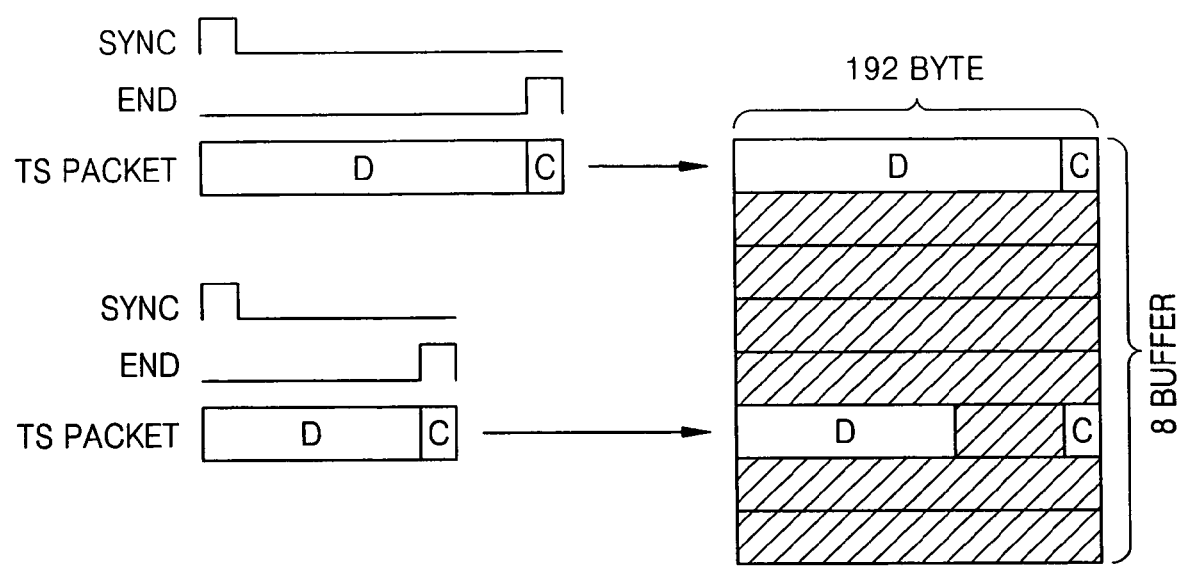
FIG. 9 is a block diagram illustrating an example of the structure of a conditional access (CA) buffer according to an exemplary embodiment of the present invention.
Figure 10:
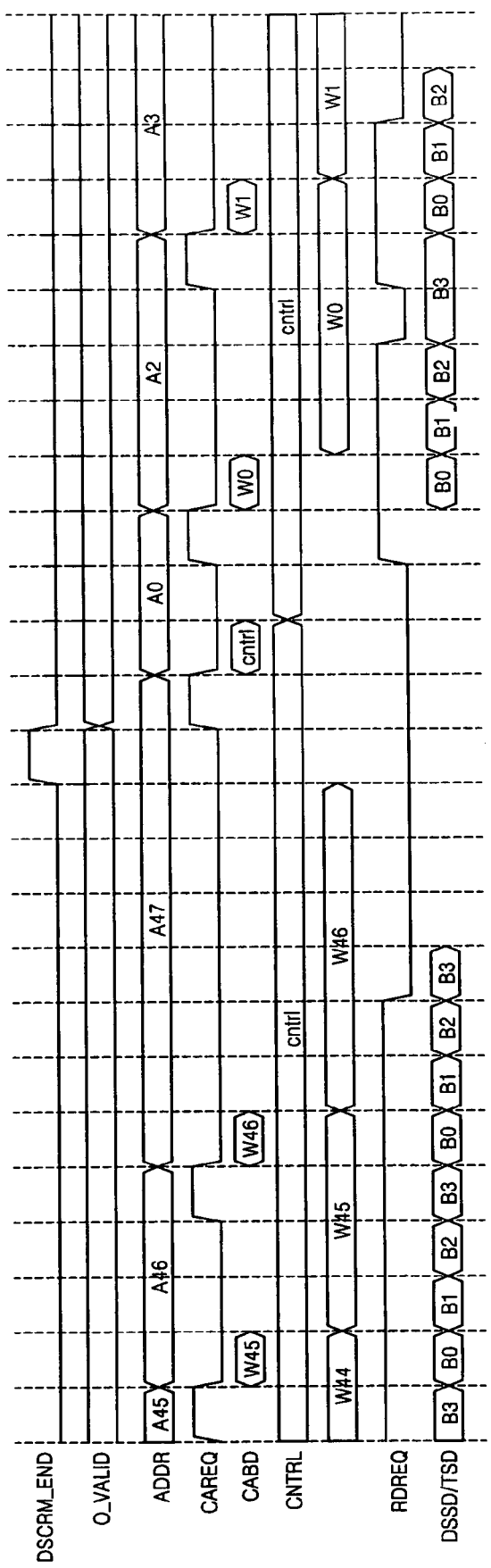
FIG. 10 is a timing chart illustrating an example of CA buffer interfacing with the arbiter and a CA module according to an exemplary embodiment of the present invention.

An example structure of the CA buffer 124 is illustrated in FIG. 9.

Referring to FIG. 9, if the digital stream is a transport stream (TS), which may have, for example, 192 bytes including the control word of four bytes, 48 words may be stored at the storing locations from an address 0 to an address 47. The words may begin being stored in, for example, synchronism with the start synchronous signal SYNC, and the control word may be stored at the storing location of the last address 47 of the CA buffer 125 in, for example, synchronism with the synchronous signal END, which may indicate the last packet. If the digital stream is a DSS stream, which may have, for example, 136 bytes including dummy data of two bytes and a control word of four bytes, 33 words may be stored in the storing places from an address 0 to an address 32. The words may begin being stored in, for example, synchronism with the start synchronous signal SYNC, and four bytes of the control word may be stored at the storing location of the last address 47 of the CA buffer 125, for example, in synchronism with the synchronous signal END, which may indicate the last packet.

For example, eight buffers may be provided, which may include 48 storage locations. The CA buffer 125 may store corresponding digital streams, which may be output from the memories (e.g., FIFO memories) 141 to 144 and the memory (e.g., FIFO memory) 123 in a unit (e.g., 192 bytes or 136 bytes) in response to the grant signals F1GNT to F4GNT and RBGNT. The grant signals F1GNT to F4GNT and RBGNT may correspond to the write request signals F1REQ to F4REQ and RBREQ from the memories 141 to 144 and the memory 123. The CA buffer 125 may output the corresponding digital streams CABD in response to a grant signal, which may correspond to the read request signal CAREQ. The read request signal CAREQ may be generated from the CA interface unit 177 using the buffer read request signal RDREQ from the CA module 126.

As described above, the demultiplexer 120 of the digital receiver (e.g., a digital broadcasting receiver) 100 according to an exemplary embodiment of the present invention may receive digital streams (e.g., digital broadcasting streams) corresponding to the channels (e.g., multiplexed broadcasting channels) in a packet or packets. The received digital streams may be stored at a storage location, which may be empty, in the CA buffer 125 and, which may have a single port memory format, such that operation of the CA buffer 125 may be more efficient without change of an output order. The digital streams may be transmitted, for example, sequentially, from the CA buffer 125 to the CA module 126 in a packet or packets in response to a request from the CA module 126, and the control words may include data, for example, from the packet identifier (PID) index. The data from the packet identifier index may identify the packets, the scramble start position, the packet type, the key type, a demultiplexing validity, and the conditional access type, so that the CA module 126 may use the control words to decode the packets.

As described above, since the demultiplexer of the digital receiver, according to exemplary embodiments of the present invention, may arbitrate the CA buffer interface by using a single port SRAM as the CA buffer and may the packet order may not be changed, the circuit area may be reduced.

Although exemplary embodiments of the present invention have been described with respect to digital systems (e.g., digital broadcasting multiplexers, receivers, etc.), it will be understood that the exemplary embodiments of the methods and systems, as described herein, may be applied to any digital system, as desired by one of ordinary skill in the art. It will also be understood that exemplary embodiments of the methods and systems, as described herein, may also be implemented in any digital audio and/or video system, as desired by one of ordinary skill in the art.

Although exemplary embodiments of the present invention have been described with respect to transport streams (TS) and/or direct satellite systems (DSS), it will be understood that exemplary embodiments of the systems and methods, as described herein, may be implemented in any suitable system, audio and/or video, as desired by one of ordinary skill in the art.

Although exemplary embodiments of the present invention are discussed with respect to DSS streams, the exemplary embodiments of the present invention should not be limited to this form of satellite television. It will be understood that exemplary embodiments of the present invention may be utilized in any audio or video system as desired by one of ordinary skill in the art.

Although exemplary embodiments of the present invention have been described with respect to a liquid crystal display (LCD), it will be understood that any suitable display may be utilized as desired by one of ordinary skill in the art.

Although exemplary embodiments of the present invention have been described as including buffer units of, for example, 192 or 136 bytes, it will be understood that any suitable size buffer unit may be used as desired by one of ordinary skill in the art. It will also be understood that although exemplary embodiments of the present invention have been described as utilizing packet units of, for example, 188 of 130 bytes, any suitable packet unit size may be used as desired by one of ordinary skill in the art.

Although exemplary embodiments of the present invention have been described with respect to encoding types such as 3 DES, DES, DVB-CSA, and AES, it will be understood that any suitable encoding method and or algorithm may be used as desired by one of ordinary skill in the art.

Although exemplary embodiments of the present invention have been described as receiving channels in, for example, a byte (8 bits) unit, it will be understood that any suitable size unit may be used as desired by one of ordinary skill in the art.

Although exemplary embodiments of the present invention have been described with respect to first-in-first-out (FIFO) memories, it will be understood that any suitable memory may be used as desired by one of ordinary skill in the art.

Although exemplary embodiments of the present invention have been described with regard to a round robin system, it will be understood that any suitable system for assigning transmission priority may be used as desired by one of ordinary skill in the art.

Although exemplary embodiments of the present invention have been described with respect to dummy data of, for example, 2 bytes and control words of, for example 4 bytes, it will be understood that the dummy data and control words may be any number of bytes as desired by one of ordinary skill in the art.

Although exemplary embodiments of the present invention have been described with respect to registers in which, for example, three byte data of eight bits may be stored, it will be understood that any suitable size register may be used as desired by one of ordinary skill in the art.

Although exemplary embodiments of the present invention have been described with respect to synchronous signals, it will be understood that asynchronous signals may be utilized as desired by one of ordinary skill in the art.

While exemplary embodiments of the present invention have been particularly shown and described, it will be understood by those skilled in the art that various changes in form and details may be made therein without departing from the spirit and scope of the present invention as defined by the appended claims.

What is claimed is:

1. A demultiplexer, comprising:
    packet identifier filters adapted to extract digital broadcasting streams and output the extracted digital broadcasting streams;
    a first memory adapted to receive the extracted digital broadcasting streams, store the digital broadcasting streams in a word unit, generate write request signals for words of a corresponding broadcasting channel, and output the words in response to grant signals;
    an arbiter adapted to determine priorities of a read request signal and corresponding write request signals of the digital broadcasting streams, and generate the grant signals corresponding to the priorities, to arbitrate read and write access to the digital broadcasting streams;
    a conditional access buffer adapted to store the digital broadcasting streams output from the first memory in response to the grant signals, and output the corresponding digital broadcasting streams in response to the grant signals;
    a conditional access module adapted to receive the digital broadcasting streams output from the conditional access buffer, descramble the received digital broadcasting streams, and generate a buffer read request signal when the received digital broadcasting streams are descrambled; and
    an external memory adapted to allow the digital broadcasting streams stored in the word unit in the first memory to be bypassed and to be temporarily stored under a direct memory access control when usage of the conditional access buffer is greater than a threshold level;
    wherein the conditional access buffer has a single port memory format, and
    wherein the write request signal corresponding to the broadcasting channel in which the bypassed words have been output is excluded from the determination of priority.

2. The demultiplexer according to claim 1, further comprising:
    a second memory, which receives and stores the bypassed words from the external memory and generates a write request signal for write access, under the direct memory access control when the usage of the conditional access buffer is less than the threshold level;
    wherein priority is given to the write request signal generated from the second memory by using a round robin system, in addition to the write request signals for the relevant channels.

3. The demultiplexer according to claim 1, wherein the input digital broadcasting streams are transport streams, which are output from the first memory in a unit of 192 bytes, including a packet of 188 bytes.

4. The demultiplexer according to claim 3, wherein a last address word stored in the conditional access buffer is a control word including data on a packet identifier index, a start position for scrambling, a packet type, a key type, a demultiplexing validity, and a conditional access type.

5. The demultiplexer according to claim 4, wherein the arbiter stores a corresponding address in a service queue when the last address word is stored in the conditional access buffer, and outputs the control word stored at the corresponding address in the conditional access buffer indicated by the service queue and outputs the other words, when the priority is assigned to the conditional access buffer in response to the read request signal generated based on the buffer read request signal.

6. The demultiplexer according to claim 1, wherein the input digital broadcasting streams are direct satellite service streams, which are output from the first memory in a unit of 136 bytes, including a packet of 130 bytes.

7. The demultiplexer according to claim 6, wherein a last address word stored in the conditional access buffer is a control word including data on a packet identifier index, a start position for scrambling, a packet type, a key type, a demultiplexing validity, and a conditional access type.

8. The demultiplexer according to claim 7, wherein the arbiter stores a corresponding address in a service queue when the last address word is stored in the conditional access buffer, and outputs the control word stored at the corresponding address in the conditional access buffer indicated by the service queue and outputs the other words, when the priority is assigned to the conditional access buffer in response to the read request signal generated based on the buffer read request signal.

9. The demultiplexer according to claim 1, wherein the first memory comprises a plurality of first-in, first-out (FIFO) memories, which store the digital broadcasting streams corresponding to the relevant channels, respectively, and each of the FIFO memories comprises:
a first register adapted to store first, second, and third bytes constituting a word of the received digital broadcasting streams;
a second register adapted to store the first, second, third bytes and a next fourth byte constituting the word or output a previous word, in response to a state control signal;
a third register adapted to store first, second, third, and fourth bytes constituting a next word during the outputting of the second register and output a previous word during the storing of the second register, in response to the state control signal; and
a state machine adapted to generate the state control signal indicating a storing time and an outputting time of the registers by using the grant signals, and generate the write request signals when the corresponding register completes the storing of a word unit.

10. The demultiplexer according to claim 1, wherein the arbiter gives the highest priority to the read request signal, and sequentially gives next priorities to the write request signals by using a round robin system.

11. A demultiplexing method, comprising:
extracting digital broadcasting streams corresponding to respective multiplex broadcasting channels from input digital broadcasting streams, and outputting the extracted digital broadcasting streams;
receiving the digital broadcasting streams corresponding to the respective broadcasting channels, storing the received digital broadcasting streams in a first memory in a word unit, and generating write request signals for words of a corresponding broadcasting channel;
outputting the words of the digital broadcasting streams in the multiplex broadcasting channels in response to grant signals;
giving priority to a read request signal and the write request signals for the digital broadcasting streams by arbitrating a bus for a read access and a write access to the digital broadcasting streams, and generating the grant signals;
storing the digital broadcasting streams output from the first memory in a buffer in response to the grant signals corresponding to the write request signals, and outputting the corresponding digital broadcasting streams in response to a grant signal for the read request signal;
receiving the digital broadcasting streams output from the buffer through arbitration of the bus, and descrambling the received digital broadcasting streams in a packet unit;
generating a buffer read request signal each time the received digital broadcasting streams are descrambled; and
allowing the digital broadcasting streams stored in the word unit in the first memory to be bypassed and to be temporarily stored in an external memory under a direct memory access control when usage of the buffer is greater than a threshold level;
wherein the buffer has a single port memory format, and
wherein the write request signal corresponding to the broadcasting channel in which the bypassed words have been output is excluded from the giving of priority.

12. The demultiplexing method according to claim 11, further comprising:
receiving again the bypassed words from the external memory and storing the received words in a second memory under the direct memory access control when the usage of the buffer is less than the threshold level; and
allowing the second memory to generate a write request signal for the write access;
wherein next priority is given to the write request signal generated from the second memory by using a round robin system, in addition to the write request signals for the relevant channels.

13. The demultiplexing method according to claim 11, wherein the input digital broadcasting streams are transport streams, which are output from the first memory in a unit of 192 bytes, including a packet of 188 bytes.

14. The demultiplexing method according to claim 13, wherein a last address word stored in the buffer is a control word including data on a packet identifier index, a start position for scrambling, a packet type, a key type, a demultiplexing validity, and a conditional access type.

15. The demultiplexing method according to claim 14, wherein the outputting of the corresponding digital broadcasting stream in response to the grant signal includes:
storing a corresponding address in a service queue when the last address word is stored in the buffer;
generating the read request signal by using the buffer read request signal;
giving priority for the use of the bus to the buffer and generating the grant signal in response to the read request signal;
outputting the control word of the digital broadcasting streams stored at the address in the buffer indicated by the service queue in response to the grant signal; and
outputting words other than the control word.

16. The demultiplexing method according to claim 11, wherein the input digital broadcasting streams are direct satellite service streams, which are output from the first memory in a unit of 136 bytes, including a packet of 130 bytes.

17. The demultiplexing method according to claim 16, wherein a last address word stored in the buffer is a control word including data on a packet identifier index, a start position for scrambling, a packet type, a key type, a demultiplexing validity, and a conditional access type.

18. The demultiplexing method according to claim 17, wherein the outputting of the corresponding digital broadcasting stream in response to the grant signal includes:
storing a corresponding address in a service queue when the last address word is stored in the buffer;
generating the read request signal by using the buffer read request signal;
giving priority for the use of the bus to the buffer and generating the grant signal in response to the read request signal;
outputting the control word of the digital broadcasting streams stored at the address in the buffer indicated by the service queue in response to the grant signal; and
outputting words other than the control word.

19. The demultiplexing method of claim 11, wherein the first memory comprises a plurality of first-in, first-out (FIFO) memories, and
wherein the storing of the received digital broadcasting streams in the first memory comprises, in each of the plurality of FIFO memories,
storing first, second, and third bytes constituting a word of the received digital broadcasting streams in a first register;

storing the first, second, third bytes and a next fourth byte constituting the word in a second register, or outputting a previous word stored in the second register, in response to a state control signal;

storing first, second, third, and fourth bytes constituting a next word in a third register during the outputting of the second register and outputting a previous word stored in the third register during the storing of the second register, in response to the state control signal; and allowing a state machine to generate the state control signal indicating a storing time and an outputting time of the registers by using the grant signals and to generate the write request signals when the corresponding register completes the storing of a word unit.

20. The demultiplexing method according to claim 11, wherein in the giving of priority, the highest priority is given to the read request signal, and next priorities are sequentially given to the write request signals by using a round robin system.

* * * * *